(12) United States Patent
Klug et al.

(10) Patent No.: US 10,272,278 B2
(45) Date of Patent: Apr. 30, 2019

(54) THERMAL RELEASE ELEMENT

(71) Applicant: JOB Lizenz GmbH & Co. KG, Ahrensburg (DE)

(72) Inventors: Rüdiger Klug, Ahrensburg (DE); Bodo Müller, Tornesch (DE); Jürgen Teschner, Hamburg (DE)

(73) Assignee: JOB Lizenz GmbH & Co. KG, Ahrensburg (DE)

( * ) Notice: Subject to any disclaimer, the term of this patent is extended or adjusted under 35 U.S.C. 154(b) by 205 days.

(21) Appl. No.: 15/208,282

(22) Filed: Jul. 12, 2016

(65) Prior Publication Data
US 2017/0028237 A1    Feb. 2, 2017

(30) Foreign Application Priority Data

Jul. 28, 2015 (DE) .................. 20 2015 103 950 U

(51) Int. Cl.
| | |
|---|---|
| *A62C 37/14* | (2006.01) |
| *A62C 3/06* | (2006.01) |
| *A62C 35/68* | (2006.01) |
| *F17C 13/04* | (2006.01) |
| *F17C 13/12* | (2006.01) |
| *F16K 17/38* | (2006.01) |

(52) U.S. Cl.
CPC ............ *A62C 37/14* (2013.01); *A62C 3/06* (2013.01); *A62C 35/68* (2013.01); *F17C 13/04* (2013.01); *F17C 13/12* (2013.01); *F16K 17/38* (2013.01)

(58) Field of Classification Search
CPC ........... A62C 37/14; A62C 3/06; A62C 35/68; F16K 17/38; F17C 13/12; F17C 13/04
See application file for complete search history.

(56) References Cited

U.S. PATENT DOCUMENTS

| | | | |
|---|---|---|---|
| 1,733,701 A | 10/1929 | Taylor | |
| 4,609,047 A * | 9/1986 | Pieczykolan | A62C 37/14 |
| | | | 169/38 |

(Continued)

FOREIGN PATENT DOCUMENTS

| | | | |
|---|---|---|---|
| DE | 3601203 | 3/1987 | |
| DE | 202013102312 | 8/2014 | |
| EP | 2433677 A2 * | 3/2012 | ............. A62C 37/14 |

OTHER PUBLICATIONS

Translation EP2433677 A2.*

*Primary Examiner* — Darren W Gorman
*Assistant Examiner* — Qingzhang Zhou
(74) *Attorney, Agent, or Firm* — Sand, Sebolt & Wernow Co., LPA

(57) ABSTRACT

A thermal release element having a container body with an outer wall formed from a frangible material and a hollow space enclosed by the outer wall and enclosing a release fluid. The body is expanded in an axial direction with a tubular middle section extending in the axial direction and two end sections at each axial end. The middle section, as seen in a sectional plane transverse to the axial direction, has an outer contour of the outer wall that deviates from a circular or oval contour. The end sections each have a circular or an oval contour of the outer wall. Transition zones are provided between the middle and end sections where the outer contour of the outer wall transitions from the shape of the middle section deviating from a circular or oval shape, into the circular or oval shape of the end sections.

11 Claims, 3 Drawing Sheets

(56) References Cited

U.S. PATENT DOCUMENTS

| | | | | |
|---|---|---|---|---|
| 4,739,835 A | * | 4/1988 | Polan | A62C 37/14 116/216 |
| 4,796,710 A | * | 1/1989 | Job | A62C 37/14 169/37 |
| 4,991,656 A | * | 2/1991 | Polan | A62C 37/14 169/38 |

* cited by examiner

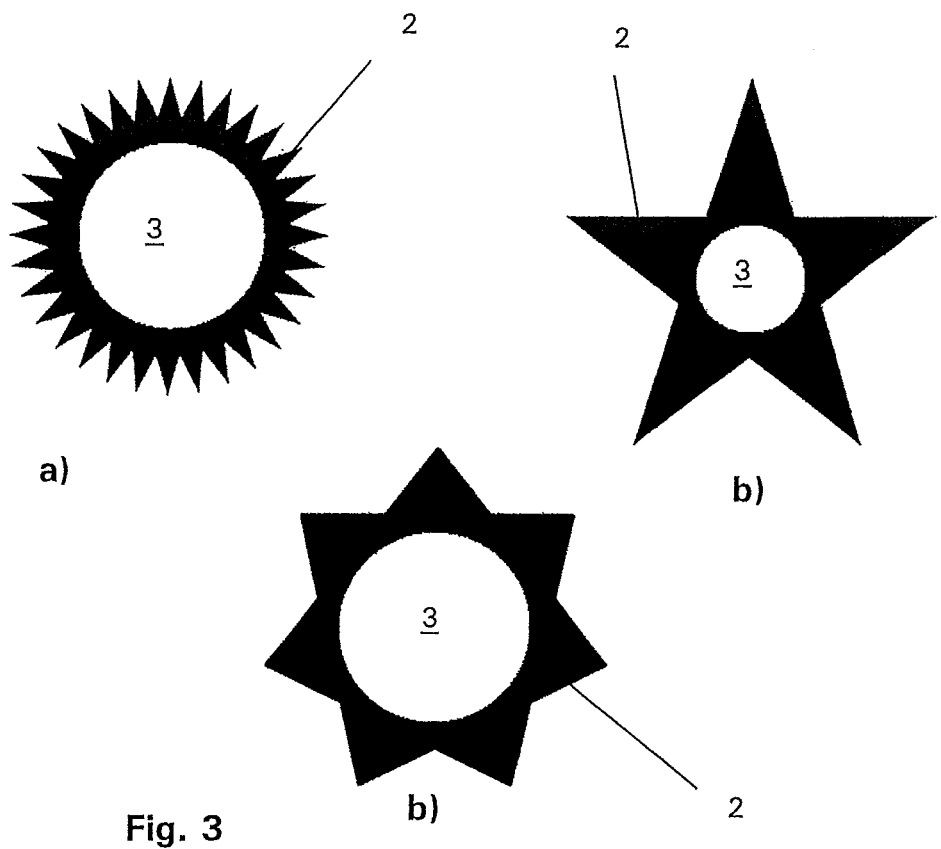
a)  b)
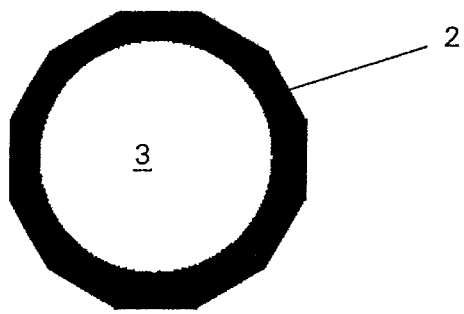
b)
Fig. 3
Fig. 4

THERMAL RELEASE ELEMENT

BACKGROUND OF THE INVENTION

Technical Field

The invention relates to a thermal release element.

Background Information

Thermal release elements have been known and in use for a long time. They are used, in particular, in large numbers in sprinkler systems and fire extinguishing systems, in which they are disposed at outlet nozzles or sprinkle outlets connected to tubing filled with a pressurized extinguishing agent (generally water), while maintaining the former in the closed position, between a thrust bearing and a closure element. If the outside temperature exceeds the release temperature to be set by corresponding and known technical measures, the frangible material of the outer wall is destroyed as a result of the build-up of the pressure with increasing temperature of the release fluid, the release element shatters and allows the closure element to open, so that the extinguishing agent is able to exit the sprinkler nozzles or sprinkler outlets and be discharged.

Aside from an application in such sprinkler systems and fire extinguishing systems, applications are also known and described, in which such release elements close pressure relief openings, in order to release them at a release temperature exceeding a critical temperature, for example, in order to timely drain compressed gas containers in cases of fire before the latter are able to explode, for example. Applications of release elements of this type are also known in connection with the interruption of a flow of electrical current. Other applications are conceivable; such release elements may always be used whenever temperature-sensitive mechanical switch positions must be changed or else electrical lines must be interrupted.

The typically known thermal release elements of the aforementioned kind, known for many years and of which one, for example, is shown and described in DE 36 01 203 A1, consistently had and have a circular or else, based on a circular target shape, a cross-sectional shape slightly ovalized due to tolerance deviations, in the tubular middle section as seen in a sectional plane transverse, in particular perpendicular, to the axial extension of the release element. This cross-sectional shape applies in this case to both the outer contour of the outer wall as well as to the inner contour thereof, which adjoins an interior hollow space. This is because during manufacture, a tubular base material was and is used, which is initially closed at a first frontal end to form the cap-like closed end section, for example, by thermal shaping, in which the interior hollow space is then filled with the extinguishing agent, and in which the second cap-like closing and end section is formed connected to the second frontal end, for example, by repeated thermal reshaping. The tubular base material being considered here consistently was and is a tube having a nominally circular cross-section, the circular cross-sectional contour relating to both the outside of the wall as well as the inner contour of the outer wall facing the tubular area or tubular section. Deviations from the ideal circular shape, which resulted in a slight ovalization of this contour, were possible and occurred only because of potential manufacturing tolerances.

To fulfill an essential requirement of thermal release elements formed in this way, which derives from the typical assembly situation in the use, in particular, for keeping a mechanical switch position of participating elements open or closed, namely, the reliable withstanding of a force directed in the direction of an opposing switch position of the mechanical elements, which bears down on the thermal release element in its axial direction, it was previously proposed in DE 20 2013 102 312 U1, to design a container body in a release element of this type so that in a tubular middle section thereof as seen in a sectional plane transverse, in particular, perpendicular to the axial direction, it has an outer contour of the outer wall and/or an inner contour of the outer wall adjoining a hollow space situated in the interior of the container body, which deviates from a circular or oval contour. Release elements having an outer contour deviating from a circular or oval shape are also already known from U.S. Pat. Nos. 4,609,047, 4,739,835 and 1,733,701. Whereas improved response behavior (in particular, a rapid release time) is said to be achieved with the particular shape of the release elements according to U.S. Pat. Nos. 4,609,047 and 4,739,835, the attachment of ribs described in U.S. Pat. No. 1,733,701 used to improve breaking (to shatter in numerous small splinters instead of preventing the formation of merely a longitudinal crack) is described.

Another previously unaddressed problem of the rapidly responding thermal release elements, in particular, which are formed with a very thin-walled container body for a short reaction time, is a perceptible sensitivity to transverse forces characteristic of these elements. Such forces occur, for example, when the sides of the release elements are inadvertently struck or bumped, for example, as a result of an unintended collision with an object or the like carried through the space. An ideal objective in this case is that a thermal release element is optimally insensitive to such transverse forces without, however, losing its immediate response behavior and the short reaction time to increases in ambient temperature.

SUMMARY

The present invention is devoted to achieving this object. This object is achieved by a thermal release element having the features of a container body having an outer wall formed from a frangible material and a hollow space situated inside the container body enclosed by the outer wall and in which a release fluid is enclosed, wherein the container body is expanded in an axial direction with a tubular middle section extending in the axial direction and two end sections situated at each axial end, in which the hollow space is sealed in a cap-like manner, wherein the container body in the tubular middle section, as seen in a sectional plane transverse, in particular, perpendicular to the axial direction, has an outer contour of the outer wall that deviates from a circular or oval contour; wherein the end sections in areas facing the middle section, each has a circular or an oval contour of the outer wall, as seen in the sectional plane transverse, in particular perpendicular to the axial direction, wherein transitions zones are provided between the middle section and the end sections, in which the outer contour of the outer wall, as seen in the sectional plane transverse, in particular, perpendicular to the axial direction, transitions from the shape of the middle section deviating from a circular or oval shape, into the circular or oval shape of the respective end section, wherein the transition zones have a longitudinal extension ($L_1$, $L_2$) in the axial direction of at least 1.5 mm. Advantageous refinements include that the transition zones have a longitudinal extension ($L_1$, $L_2$) in the axial direction of 1.5 to 3.0 mm or that the longitudinal extension ($L_1$, $L_2$) of the transition zones in the axial direction is from 2.0 to 2.5 mm, in particular, from 2.0 to 2.2 mm. The tubular middle section of the container body, as seen in the sectional plane transverse, in particular, perpendicular to the axial direction, has an outer contour of the outer wall in the shape of a polygon. The polygonal shape is a regular polygon or a star shape. The tubular middle section of the container body, as seen in the sectional plane transverse, in particular, perpendicular to the axial direction, has an outer contour of the outer wall in the shape of a circle or oval with ribs molded thereon or with attached bulges. The container body, at least in its middle tubular section has reinforcing zones applied to and securely connected to an outer side of the outer wall and the reinforcing zones are columnar and extend in the axial direction. Furthermore, in the middle section, the cross-section deviating from the circular or oval shape rotates for sectional planes shifted in parallel in the axial direction. The thermal release element has a specific length over the entire axial extension that is from 12 mm to 50 mm. The frangible material used is glass. Additionally, the container body has a wall thickness (d) of ≤0.5 mm, at least in the middle section and there in at least selected areas. A gas bubble is disposed in the hollow space in addition to the release fluid. The thermal release element is formed from a tubular initial workpiece made of the frangible material, by sealing one end of the initial workpiece at a first frontal end to obtain a semi-finished product, filling the hollow space situated in the semi-finished product with the release fluid and sealing the semi-finished product at the second frontal end opposite the first frontal end, wherein the tubular initial workpiece, as seen in a sectional plane transverse, in particular perpendicular to an axial direction of the semi-finished product, has an outer contour of its outer wall that deviates from a circular or oval contour.

In the course of extensive analyses and simulations performed, it was recognized within the scope of the invention that a cross-sectional contour situated in a middle section on the outside of the thermal release element, which deviates from a circular or oval shape, provides a significant improvement of the resistance to transverse forces (a reduction in sensitivity to such forces), when transition zones are provided, in which the cross-sectional contour in the middle section deviating from the circular or oval shape is transitioned to a circular or oval-shaped cross-sectional contour in the adjoining degeneration, and these transition zones have a longitudinal extension in the axial direction of the expansion of the container body of at least 1.5 mm. This measure ensures a smooth transition which, as the results of the analyses have shown, produces the significant improvement in the resistance to transverse forces. The reaction time and the release behavior of such a thermal release element remain unchanged with very good values and characteristics, since the wall thicknesses of the container body may be kept to a corresponding minimum.

Accordingly, in these transition zones, a smooth and continuous transition of the cross-sectional shape in the middle section to the cross-sectional shape in the respectively adjoining end section preferably takes place. The transition zones may each advantageously have a longitudinal extension in the axial direction of 1.5 mm up to 3.0 mm. Longer designed transition zones, on the other hand, have namely proven to be disadvantageous, in particular, since they presuppose a correspondingly shortened middle section which, in turn, is not sufficiently stable in order to achieve the targeted robustness to transverse forces. The longitudinal extensions of the transition zones in the axial direction may be, in particular, from 2.0 to 2.5 mm, preferably from 2.0 to 2.2 mm.

One possible contouring that has proven favorable and positive in connection with the development is seen in a contour having a polygonal shape. In such case, a polygonal shape will, in particular, have the shape of a regular polygon or else a star shape, which may, in particular, also be regularly formed. With respect to a shape of a regular polygon, but also for the star shape, in particular, polygonal shapes have proven particularly favorable, the number of straight polylines of which, strung together, is not too high. If the polygon, in particular, a regular polygon becomes too small-scaled, i.e., if too many straight linear segments are strung together, the cross-sectional contour, in turn, approximates the shape of a circle, thereby eroding the advantage of the contour deviating from this circular shape. For regular polygons, polygonal outer contours having a maximum number of 12 straight linear segments or fewer, in particular, a number in the single digits, have proven particularly suitable for the tube diameter of a few millimeters used in corresponding thermal release elements. However, it is also possible, of course, in the case of regular polygons to select outer contours having a higher number of straight linear segments, as long it does not approximate a circular shape.

Alternatively, however, implementations have also been recognized as particularly favorable, in which the outer contour deviating from the circular shape has, as a type of base shape, a circular shape or oval shape, on which bulges are attached or formed, i.e., linear pattern segments which break out of the linear pattern of the circular or oval shape. Such cross-sections may, for example, have a blossom-shaped design.

Such a cross-section may be obtained, in particular, by including reinforcing zones in the container body, at least in its middle tubular section, applied to an outer side of the outer wall, and securely connected to said wall. These may, for example, be solid-type reinforcing plates. In this context, "applied to the outer side or the inner side" does not necessarily mean that here subsequently applied material must be present. It is equally possible for a corresponding shaping to already be provided during the manufacture of the tubular middle section. Thus, the word "applied" in this case merely means that compared to a circular or oval shape, additional material is present in certain sections, which adds on the said bulges in the cross-section. In principle, the reinforcing zones may also be helically shaped or otherwise distinctively formed on a path aligned in parallel to the axial extension.

The thermal release element according to the invention may have a specific length, in particular over the entire axial extension, of 12 to 50 mm, lengths of 15 to 25 mm are typical.

The frangible material, of which the outer wall of the thermal release element consists, is, in particular, and particularly advantageously, glass. Glass in this case has very diverse advantages. For one thing, glass is inert to a high degree, which is conducive to a long service life of the thermal release element, even in surroundings having an aggressive atmosphere. Glass is also transparent and permits a visual inspection of the interior space inside, which is filled with the release fluid, which may, in particular, be dyed. This is of particular advantage, for example, already in conjunction with the quality control during manufacture. In addition, glass per se is a brittle material, which breaks into small pieces in cases of release and thereby guarantees a safe switching operation of the mechanical switch travel to be carried out after release of the thermal release element. Furthermore, glass may be technologically very strongly influenced with respect to its fracture properties and other mechanical properties. Finally, it is particularly well suited for a processing as a step towards the manufacture of the thermal release element according to the invention, it is, in particular, excellent for shaping by heat treatment, for example, in order to form the closures at the end (the cap-like end seals).

For a rapid response of the thermal release element, the wall thickness of the container body, at least in the middle section, and there at least in selected zones, is advantageously ≤0.5 mm.

Also advantageously arranged in the hollow space, in addition to the release fluid, is a gas bubble. This provision of a gas bubble enables a reliable pressure build-up in the interior of the hollow space as the temperature rises and, therefore, a reliable and temperature-precise release of the thermal release element at the selected release temperature.

The release element according to the invention may be manufactured, in particular, by initially sealing in a first step one end of a tubular initial workpiece made of frangible material at a first frontal end in order to thus obtain a semi-finished product, the workpiece having an outer contour of its outer wall as seen in a sectional plane transverse, in particular, perpendicular to an axial direction of the initial workpiece, which deviates from a circular or oval contour. The hollow space situated in this semi-finished product, the interior space of the tubular initial workpiece sealed at one end, is then filled in a second step with the release fluid. The semi-finished product is then sealed at the second frontal end opposite the first frontal end. In the process, the semi-finished product may, in particular, be filled with the release fluid so that after sealing, a gas bubble remains in the hollow space of the release element now closed on all sides. It should be noted in this case that the transition zones are correspondingly soft and continuous in design, having an axial extension with the aforementioned values.

BRIEF DESCRIPTION OF THE SEVERAL VIEWS OF THE DRAWINGS

Additional advantages and features of the invention result from the following description of exemplary embodiments with reference to the appended figures, in which:

FIG. 3 shows different cross-sectional contours of the middle section of a thermal release element according to the invention in three different views a, b, c with a star-shaped outer contour of the outer wall;

FIG. 4 shows a cross-sectional representation of the middle zone of a thermal release element according to the invention having contours in the shape of a regular polygon.

The figures merely show schematic illustrations used to explain the invention and are in no way true to scale.

DETAILED DESCRIPTION

Figure 1:
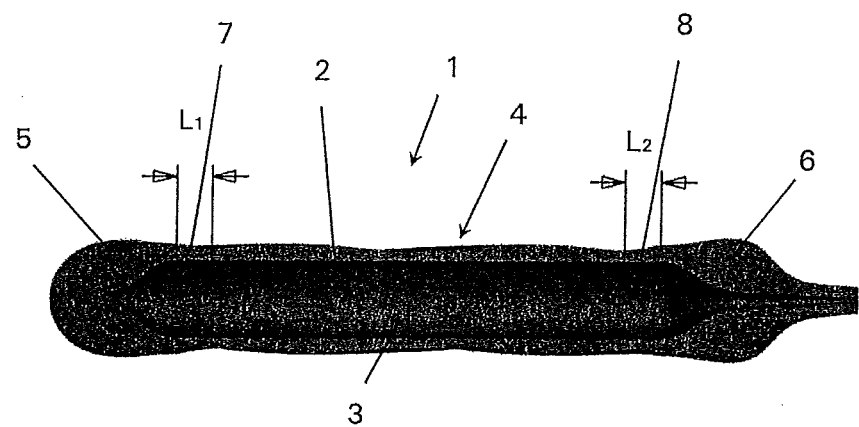
FIG. 1 shows a schematic cross-sectional representation of a thermal release element according to the invention in a longitudinal section.

FIG. 1 schematically shows a longitudinal sectional representation of a thermal release element 1 according to the invention. This thermal release element 1 has a container body enclosed on all sides by an outer wall 2, in the inside of which an interior hollow space 3 is formed. The container body is subdivided into a middle section 4, which is tubular in shape, and extends elongated in an axial direction, as well as two end sections 5, 6 formed at each axial end of the middle section 4, in which the hollow space 3 is sealed in a cap-like manner. A release fluid, not depicted here, is disposed in the interior of the hollow space 3, and also located therein is a gas bubble. A transition zone 8 is located between the middle section 4 and the end section 5. A second transition zone is located between the middle section 4 and the end section 6. The transition zone 7 has an axial longitudinal extension $L_1$ and the transition zone 8 has an axial extension of $L_2$. The outer wall 2 of the thermal release element 1 is manufactured from a frangible material, in this case, in particular, glass. The thermal release element 1 in this embodiment has a total length of approximately 12 to 50 mm.

If the environment of the outer wall 2 is exposed to an increased temperature, which causes the release fluid to generate a sufficiently high pressure inside the hollow space 3 to burst the outer wall consisting of the frangible material, the thermal release element 1 collapses in a known manner, thereby freeing, for example, a space between thrust bearings, between which it is disposed. In the case of a sprinkler system, the closure element of the sprinkler nozzle may then yield to the existing pressure of the sprinkler fluid, which opens the nozzle. In the case of a pressure relief valve for a pressurized gas container, for example, this valve opens, and gas may flow from the container in a controlled manner.

Figure 2:
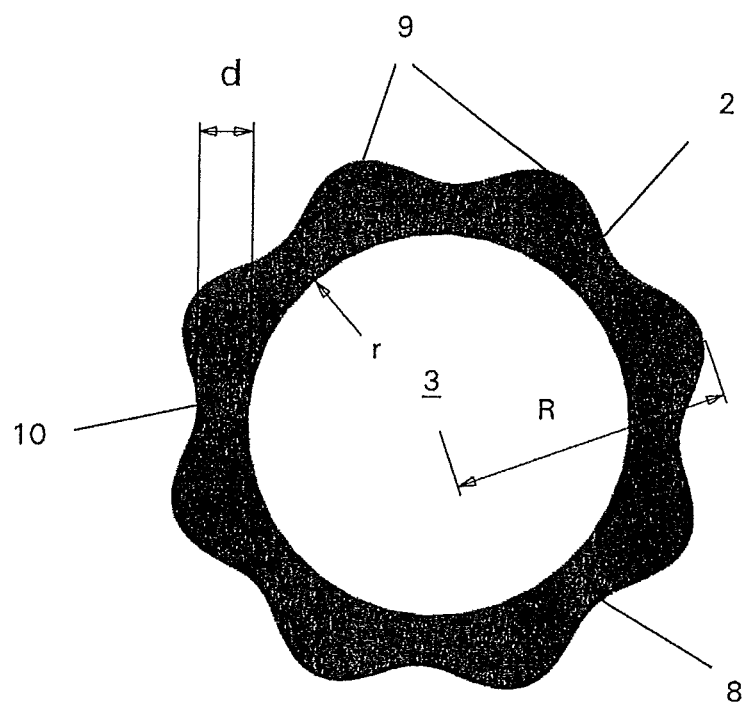
FIG. 2 shows the cross-sectional contour of a middle section of the thermal release element shown in FIG. 1.

In the middle section 4, as shown in the thermal release element 1 in FIG. 1, as in FIG. 2, the outer contour of the container wall is formed with a cross-section deviating from a circular shape and also from an oval shape. Here, ribs 9 and interjacent troughs 10 are formed. The hollow space 3 delimited in cross-section by a circular contour has a radius r. R designates a radius of an area which surrounds the outermost points of the ribs 9. The wall of the container body 2 in the middle section is designed with the lowest wall thickness 3 in the bottom of the troughs 10, there, said wall thickness is advantageously 0.3 mm or less.

A total of eight ribs 9 are provided in the middle section in the exemplary embodiment shown in FIGS. 1 and 2. These are, as is apparent in FIG. 1, wound helically around the longitudinal axis of the thermal release element 1. In the transition zones 7, 8, the cross-sectional contour of the shape deviating from a circular shape and also an oval shape, gently transitions into a circular cross-sectional contour in each of the connecting end sections 5, 6. This gentle and continuous transitioning of the cross-sectional contour occurs over the respective lengths $L_1$ and $L_2$. These lengths $L_1$, $L_2$ are each at least 1.5 mm, are sized preferably no greater than 3 mm. They are particularly advantageously at 2.0 to 2.5 mm, in particular at 2.0 to 2.2 mm. The lengths $L_1$, $L_2$ may, in principle, be sized differently, but are preferably selected substantially equal in length.

These transition zones in the indicated dimensions and with the gentle transition of the cross-sectional contour are what produce a significant increase in the resistance to transverse forces, as was unexpectedly shown and could be confirmed in simulations and actual trials. Trials showed an increase by at least 50% in the dimension according to the invention relative to comparative samples without the transitions zone according to the invention.

However, the cross-sectional shape shown in FIG. 2 is not the only one the middle section 4 is able to assume. Other shapes are conceivable, in which (even with a cross-sectional shape according to the illustration in FIG. 2), helically wound structures, but also structures extending straight in the longitudinal direction of the thermal release element 1 are conceivable in the middle section 4.

Figure 5:
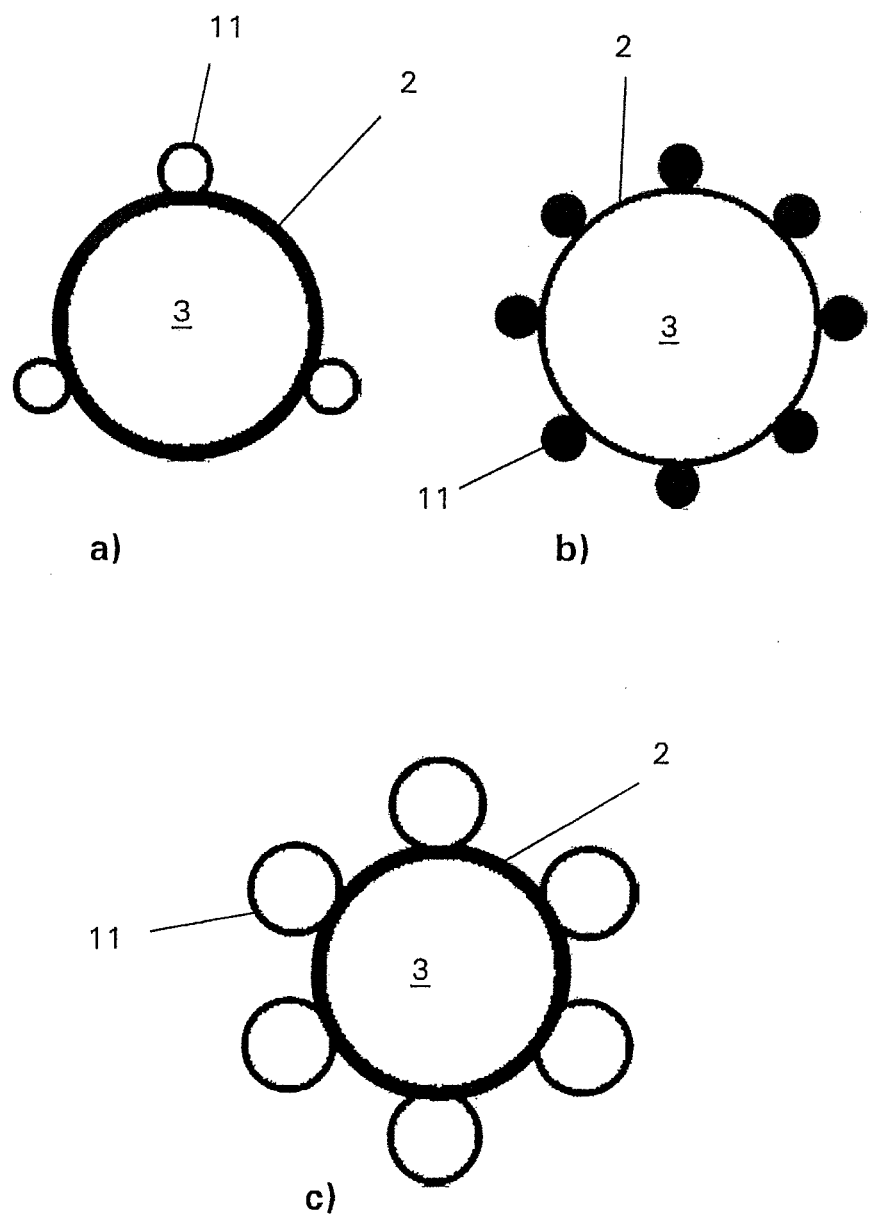
FIG. 5 shows different design variants in three illustrations a-c of cross-sections in the middle zone of a thermal release element according to the invention, in which the cross-sections have a basic circular shape with bulges arranged thereon.

Additional possible cross-sectional shapes of the middle section are shown in FIGS. 3, 4 and 5, each in different manifestation in the illustrations a-c according to FIG. 3 or 5 and in the illustrations of FIG. 4. Here, too, it is also significant that the transition zones 7, 8 provide a gentle contour transition and the lengths $L_1$ and $L_2$ of which satisfy the aforementioned dimensions.

FIG. 3 combines a group of possible cross-sectional forms, in which the outer wall 2 in the middle section 4 has a cross-section on its outside with a star-shaped contour. Here, star-shaped outer contours are illustrated having regularly arranged and defined sharp points, each with different numbers thereof. On the inner side that faces the hollow space 3, the outer wall 2 in the exemplary embodiments shown here still has a circular cross-section in the middle section 4.

Unlike the case group with the star-shaped cross-section of the middle section, a case is shown in FIG. 4, in which the cross-sectional contour in the middle section has the shape of a regular polygon, in this case, a regular dodecagon. Here, too, the outer contour in the middle section 4 on the inner side of the outer wall, i.e., the side facing the hollow space 3, is also circularly formed.

Other possibilities for designing a cross-section in the middle section 4 that deviates from the circular shape are illustrated in FIG. 5. Here, cases are shown—again in various possible implementations—in which, based on an initially circular profile on both the outer side and on the inner side, or based on a circular outer contour of the outer wall 2 in its cross-section in the middle section, bulges, designated with reference numeral 11 in the figures, are provided, which result in a deviation from the circular shape of this contour. These bulges 11 may be produced, in particular, by column-like or strut-like structures extending in the axial direction of the middle section 4 and, therefore, also of the thermal release element 1.

It is readily apparent in all the images according to FIGS. 2 through 5, that here an outer contour of the outer wall 2 in the middle section 4 of the thermal release element 1, which deviates from a circular shape or oval shape, was consciously selected. This consciously selected deviating shape, in cooperation with the transition zones 7 and 8 of sufficient measured length in the axial direction as described above, in which the cross-sectional shape of the middle section 4 is transitioned to the circular shape of the cross-section in the respective end sections 5 and 6, results in a significantly improved resistance of the thermal release element 1 to transverse forces. In particular, the release behavior or reaction behavior of the thermal release element 1 in this case continues to be favorable, enabled substantially by the—at least in sections—retained thin wall thickness and also supported by the enlarged surface, in particular, further reduced release times or reaction times maybe achieved.

LIST OF REFERENCE NUMERALS

1 Thermal release element
2 Outer wall
3 Hollow space
4 Middle section
5 End section
6 End section
7 Transition zone
8 Transition zone
9 Rib
10 Trough
11 Bulge
d Wall thickness
$L_1$ Axial length
$L_2$ Axial length
r Radius
R Radius

The invention claimed is:

1. A thermal release element comprising a container body having an outer wall formed from a frangible material and a hollow space situated inside the container body enclosed by the outer wall and in which a release fluid is enclosed, wherein the container body is expanded in an axial direction with a tubular middle section extending in the axial direction and two end sections situated at each axial end, wherein the two end sections form caps that seal the hollow space, wherein the container body in the tubular middle section, as seen in a sectional plane transverse to the axial direction, has an outer contour of the outer wall that deviates from a circular contour, and wherein the end sections, in areas facing the middle section, each have a circular contour of the outer wall, as seen in the sectional plane transverse to the axial direction, wherein transitions zones are provided between the middle section and the end sections in which the outer contour of the outer wall, as seen in the sectional plane transverse to the axial direction, transitions from the contour of the middle section deviating from the circular contour, into the circular contour of the respective end section, wherein the transition zones have a longitudinal extension ($L_1$, $L_2$) in the axial direction of at least 1.5 mm; and wherein in the middle section, the cross-section deviating from the circular contour rotates for sectional planes shifted in parallel in the axial direction.

2. The thermal release element according to claim 1, wherein the transition zones have a longitudinal extension ($L_1$, $L_2$) in the axial direction of 1.5 to 3.0 mm.

3. The thermal release element according to claim 2, wherein the longitudinal extension ($L_1$, $L_2$) of the transition zones in the axial direction is from 2.0 to 2.5 mm.

4. The thermal release element according to claim 1, wherein the thermal release element has a specific length over the entire axial extension and the specific length is from about 12 mm up to about 50 mm.

5. The thermal release element according to claim 1, wherein the frangible material is glass.

6. The thermal release element according to claim 1, wherein the container body has a wall thickness (d) of ≤0.5 mm, at least in the middle section and there in at least selected areas.

7. The thermal release element according to claim 1, wherein a gas bubble is disposed in the hollow space in addition to the release fluid.

8. The thermal release element according to claim 1, wherein the thermal release element is formed from a tubular initial workpiece made of the frangible material, by sealing one end of the initial workpiece at a first frontal end to obtain a semi-finished product, filling the hollow space situated in the semi-finished product with the release fluid and sealing the semi-finished product at the second frontal end opposite the first frontal end, wherein the tubular initial workpiece, as seen in the sectional plane transverse to the axial direction of the semi-finished product, has an outer contour of its outer wall that deviates from a circular contour.

9. The thermal release element according to claim 1, wherein the container body in the tubular middle section as seen in a sectional plane transverse that is perpendicular to the axial direction, has an outer contour of the outer wall that deviates from a circular contour.

10. The thermal release element according to claim 3, wherein the longitudinal extension ($L_1$, $L_2$) of the transition zones in the axial direction is from 2.0 to 2.2 mm.

11. The thermal release element according to claim 1, wherein the circular contour is one of a circle, an oval, and an ellipse.

* * * * *